United States Patent
Mitsue (10) Patent No.: US 10,632,510 B2
(45) Date of Patent: Apr. 28, 2020

(54) FEMALE SCREW CLEANING METHOD

(71) Applicant: SUGINO MACHINE LIMITED, Uozu (JP)

(72) Inventor: Toyoaki Mitsue, Uozu (JP)

(73) Assignee: SUGINO MACHINE LIMITED, Uozu, Toyama Prefecture (JP)

( * ) Notice: Subject to any disclaimer, the term of this patent is extended or adjusted under 35 U.S.C. 154(b) by 205 days.

(21) Appl. No.: 15/459,763

(22) Filed: Mar. 15, 2017

(65) Prior Publication Data

US 2018/0015511 A1 Jan. 18, 2018

(30) Foreign Application Priority Data

Jul. 15, 2016 (JP) .................. 2016-140756

(51) Int. Cl.
| | | |
|---|---|---|
| *B08B 3/02* | (2006.01) | |
| *B08B 9/00* | (2006.01) | |
| *B08B 9/032* | (2006.01) | |
| *B23G 9/00* | (2006.01) | |
| *B28D 7/02* | (2006.01) | |
| *B23Q 11/00* | (2006.01) | |

(52) U.S. Cl.
CPC .............. *B08B 9/0321* (2013.01); *B08B 3/02* (2013.01); *B08B 9/00* (2013.01); *B23G 9/009* (2013.01); *B28D 7/02* (2013.01); *B08B 2203/02* (2013.01); *B08B 2209/032* (2013.01); *B23G 2240/08* (2013.01); *B23Q 11/005* (2013.01); *B23Q 11/0075* (2013.01)

(58) Field of Classification Search
None
See application file for complete search history.

(56) References Cited

U.S. PATENT DOCUMENTS

| | | | |
|---|---|---|---|
| 6,154,972 A | 12/2000 | Otsubo | |
| 2002/0030122 A1* | 3/2002 | Barnes | B05B 7/0075 239/423 |
| 2003/0044249 A1* | 3/2003 | Costa | B23G 5/06 408/124 |

FOREIGN PATENT DOCUMENTS

| | | |
|---|---|---|
| CN | 102271821 A | 12/2011 |
| CN | 205253390 U | 5/2016 |
| DE | 3523647 A1 | 2/1986 |
| EP | 1072317 A2 | 1/2001 |
| JP | S55-005707 A | 1/1980 |
| JP | H03-052682 A | 3/1991 |
| JP | H0352682 U * | 5/1991 |
| JP | H10-024269 A | 1/1998 |
| JP | 2009-279564 A | 12/2009 |
| JP | 2009279564 A * | 12/2009 |
| JP | 2015-058479 A | 3/2015 |

OTHER PUBLICATIONS

Extended European Search Report dated Oct. 19, 2017 in a corresponding European patent application No. 17161011.6.

* cited by examiner

*Primary Examiner* — Katelyn B Whatley
(74) *Attorney, Agent, or Firm* — United IP Counselors, LLC (57) ABSTRACT

A cleaning method allows reliable cleaning of thread roots of a female screw. A cleaning method for a female screw includes producing a jet of a cleaning liquid from a nozzle in a direction tilted from an axis of the female screw without inserting the nozzle in the female screw, and directing the jet to impinge on a thread of the female screw while rotating the jet about the axis.

4 Claims, 9 Drawing Sheets

FEMALE SCREW CLEANING METHOD

CROSS-REFERENCE TO RELATED APPLICATIONS

This application claims the benefit of priority to Japanese Patent Application No. 2016-140756, filed on Jul. 15, 2016, the entire contents of which are hereby incorporated by reference.

BACKGROUND

1. Technical Field

The present invention relates to a cleaning method and a cleaning device for cleaning a female screw with a jet.

2. Description of the Background

A cleaning device known in the art moves a turret including various cleaning nozzles with a moving unit that uses orthogonal axes (e.g., Japanese Unexamined Patent Application Publication No. 2015-58479). This cleaning device directs a cleaning liquid ejected from a nozzle onto a female screw, an oil channel, and an edge of a machined surface of an object to be cleaned (hereafter, a workpiece). The jet of the cleaning liquid has a dynamic pressure that can remove foreign matter remaining on the female screw and other parts. To clean a female screw included in a workpiece, a jet of a cleaning liquid is directed onto the workpiece along the axis of the female screw (e.g., refer to JCC (trademark registered in Japan) General High-efficiency Washing System Jet Clean Center Series, p 7, Cleaning Nozzle Attachment, published by Sugino Machine Limited).

BRIEF SUMMARY

The jet of the cleaning liquid is directed onto the workpiece along the axis of the female screw, without directly impinging on the screw thread. In this case, foreign matter may remain on the thread roots. One or more aspects of the present invention are directed to a cleaning method that allows less foreign matter to remain on thread roots.

One aspect of the present invention provides a cleaning method for a female screw, the method including:

producing a jet of a cleaning liquid from a nozzle in a direction tilted from an axis of the female screw without inserting the nozzle in the female screw; and directing the jet to impinge on a thread of the female screw while rotating the jet about the axis.

Another aspect of the present invention provides a cleaning device for a female screw, the device including:

a housing having a rotation axis;

a moving unit configured to move the housing to have the rotation axis that is aligned with a central axis of the female screw;

a spindle rotatable about the rotation axis; and a nozzle having an nozzle hole inwardly tilted to eject a jet that intersects with the rotation axis, the nozzle being configured to rotate in cooperation with the spindle.

One or more aspects of the present invention allow less foreign matter to remain on thread roots.

DETAILED DESCRIPTION

Embodiments of the present invention will now be described with reference to the drawings.

First Embodiment

Figure 1:
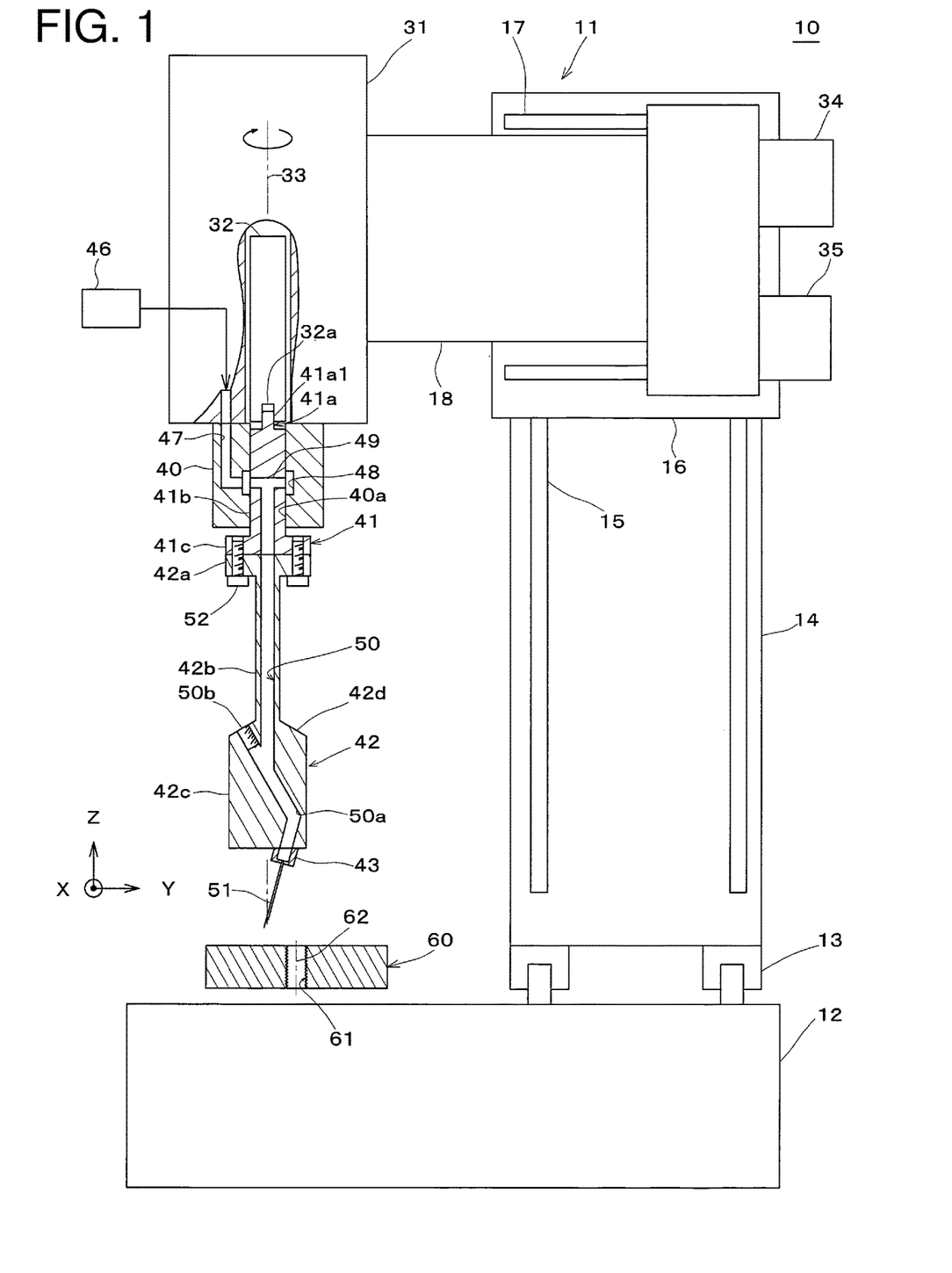
FIG. 1 is a partial longitudinal cross-sectional view of a cleaning device according to a first embodiment.
Figure 2:
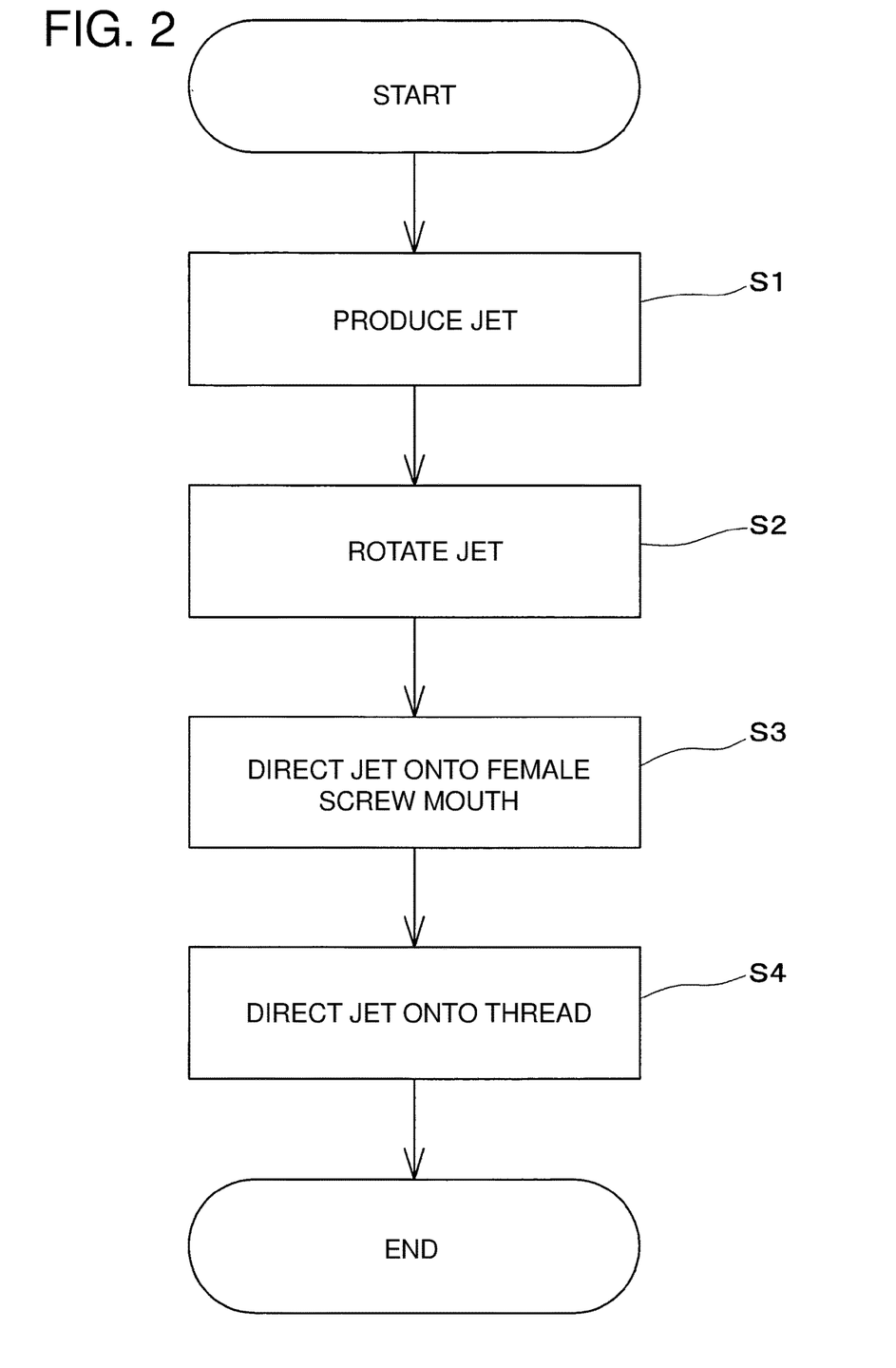
FIG. 2 is a flowchart showing a cleaning method according to the first embodiment.

FIG. 1 is a partial cross-sectional right side view of a cleaning device 10 according to a first embodiment. The cleaning device 10 includes a nozzle 43, a nozzle block 42, a spindle 41, a housing 40, and a turret 31. FIG. 1 is a partial cross-sectional view of the nozzle 43, the nozzle block 42, the spindle 41, the housing 40, and the turret 31 taken along a plane extending along the rotation axis 33 of the spindle 41. The cleaning device 10 is used to clean a female screw 61 in a workpiece 60 set inside the device. In the figures, the X-axis is the lateral direction (direction orthogonal to the sheet of FIG. 1), the Z-axis shows the direction against the gravitational force (upward in FIG. 1), and the Y-axis shows the depth direction (rightward in FIG. 1). These axes are only examples, and may be changed.

The cleaning device 10 includes a moving unit 11 for moving the housing 40. The moving unit 11 includes a bed 12, an X-axis guide 13, a movable column 14, a Z-axis guide 15, a Z-axis saddle 16, a Y-axis guide 17, and a slide 18. The X-axis guide 13 extends on the bed 12 along the X-axis. The movable column 14 is mounted on the X-axis guide 13 in a manner movable along the X-axis. The Z-axis guide 15 extends on the movable column 14 along the Z-axis. The Z-axis saddle 16 is mounted on the Z-axis guide 15 in a manner movable along the Z-axis guide 15. The Y-axis guide 17 extends on the Z-axis saddle 16 in the Y direction. The slide 18 is mounted on the Y-axis guide 17 in a manner movable along the Y-axis. The front end of the slide 18 has the turret 31. The rear end of the slide 18 has driving devices 34 and 35 for driving the turret 31 and a drive shaft 32.

The turret 31 has the housing 40, which is hollow and cylindrical. The housing 40 has an internal cylindrical hole 40a, which has a flat inner wall. The rotation axis 33 of the spindle 41 extends through the center of the cylindrical hole 40a. The cylindrical hole 40a receives the spindle 41. The spindle 41 includes an engagement part 41a, a shaft 41b, and a flange 41c. The engagement part 41a is parallel to the rotation axis 33 and has an engagement surface 41a1 symmetrical with respect to the rotation axis 33. The engagement part 41a may be a parallel key. The shaft 41b can slide in the direction of rotation in the cylindrical hole 40a. The flange 41c fixes the nozzle block 42.

The drive shaft 32 is arranged in the turret 31 and is coaxial with the spindle 41. The drive shaft 32 thus rotates about the rotation axis 33 to drive the spindle 41. The drive shaft 32 includes a receiving part 32a. The receiving part 32a is a rectangular groove for slidably receiving the engagement surface 41a1. The receiving part 32a is engaged with the engagement part 41a and rotates the drive shaft 32 and the spindle 41 in cooperation with each other.

The nozzle block 42 includes a flange 42a, a pipe 42b, and a block 42c. The flange 42a is arranged at an upper end of the pipe 42b. The flange 42a is fixed to the flange 41c with bolts 52. The pipe 42b is integral with the flange 42a and the block 42c. The block 42c is a rectangular prism. The block 42c has a top, slightly tilted shoulder 42d. The nozzle block 42 rotates about the rotation axis 33 in a substantially balanced manner. The nozzle block 42 has the nozzle 43 fixed to it. The nozzle 43 rotates in cooperation with the spindle 41.

The cleaning device 10 further includes a cleaning liquid source 46. The cleaning liquid source 46 is, for example, a piston pump. Examples of the cleaning liquid include neutral to alkaline aqueous cleaners.

The cleaning liquid source 46 is connected to the nozzle 43 with an annular groove 48 and flow channels 47, 49, and 50. The annular groove 48 is formed in the housing 40 to surround the cylindrical hole 40a. The flow channel 47, which is formed in the housing 40 and the turret 31, connects the cleaning liquid source 46 to the annular groove 48. The flow channel 49, which is T-shaped, is formed in the spindle 41. The top of the flow channel 49 aligns with the annular groove 48. The flow channel 49 connects with the flow channel 50 formed in the nozzle block 42. When the spindle 41 rotates, the flow channel 49 also rotates along the annular groove 48. The cleaning liquid source 46 is constantly connected to the nozzle 43 through the annular groove 48 irrespective of the rotational direction. The flow channel 50 includes a V-shaped flow channel 50a, which extends in the pipe 42b and the block 42c. The flow channel 50a extends upward through the shoulder 42d. The opening of the flow channel 50a through the shoulder is sealed with a plug 50b. The lower end of the flow channel 50a has the nozzle 43 tilted from the rotation axis. The upper part of the flow channel 50a is perpendicular to the shoulder 42d. The lower part of the flow channel 50a is coaxial with the nozzle 43. The lower part of the flow channel 50a serves to straighten the flow.

As shown in FIGS. 1 and 3A to 3C, the nozzle 43 is arranged along the flow channel 50. The nozzle 43 is a straight jet nozzle. More specifically, the nozzle 43 ejects a straight jet stream from its nozzle hole 43a. The nozzle hole 43a is spaced at a distance r from the rotation axis 33. The nozzle hole 43a is inwardly tilted to the rotation axis. A jet 51 ejected from the nozzle 43 intersects with the rotation axis 33. A jet centerline 51a of the jet 51 and the rotation axis 33 form an acute angle θ (included angle). The distal end of the nozzle 43 or the flow channel 50a may have a flow straightening device. The flow straightening device may be, for example, a flow straightening device described in Japanese Unexamined Patent Application Publication No. 2016-56834.

The cleaning device may be, for example, a cleaning device described in Japanese Unexamined Patent Application Publication No. 2015-58479.

Referring to FIGS. 1 to 3C, a method for cleaning a female screw will now be described. The cleaning liquid source 46 first feeds the cleaning liquid to the nozzle 43 to produce the jet 51 (S1). The drive shaft 32 is then rotated. This rotates the nozzle 43, and then rotates the jet 51 (S2). The moving unit 11 then moves the turret 31 and directs the rotating jet 51 onto a mouth 63 of the female screw (S3). The moving unit 11 then moves the turret 31 along a central axis 62 and directs the rotating jet 51 onto a thread 64 (S4). Steps S1 to S3 may be performed simultaneously or in a different order.

Figure 3A:
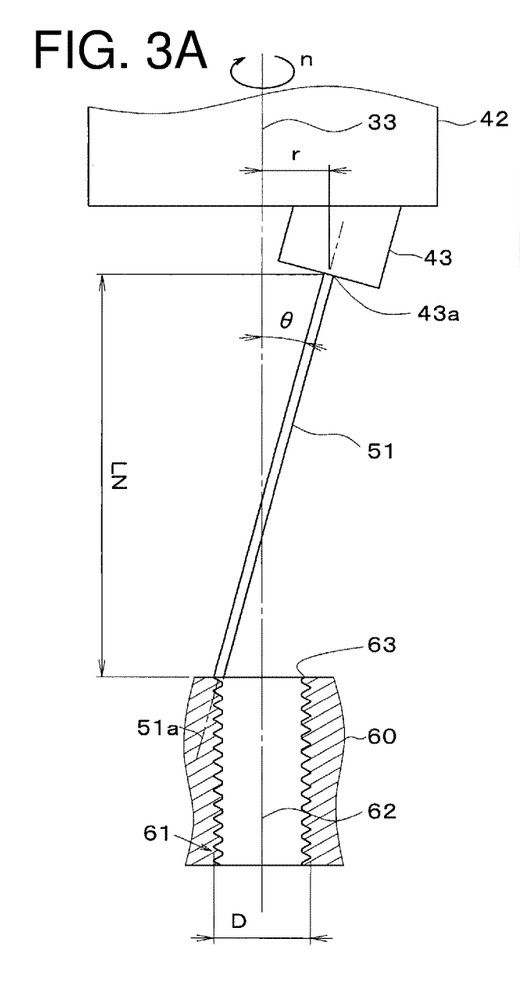
FIGS. 3A to 3C are diagrams describing the cleaning method according to the first embodiment.

Steps S3 and S4 will now be described in detail with reference to FIGS. 3A to 3C. The cleaning method according to the present embodiment may be performed with the nozzle 43 and the thread 64 exposed to the atmosphere. FIG. 3A shows the state of cleaning after step S3. In this state, the jet 51 impinges on the mouth 63. The rotation axis 33 is aligned with the central axis 62. The nozzle 43 approaches the workpiece 60 until the jet centerline 51a passes through the mouth 63. The distance LN between the nozzle hole 43a and the mouth 63 is obtained using the expression below:

$$LN = \frac{r + D/2}{\tan\theta}$$

where r is the distance between the nozzle hole 43a and the rotation axis 33, D is the major diameter of the female screw, and θ is the included angle between the jet centerline 51a and the rotation axis 33.

Figure 3B:
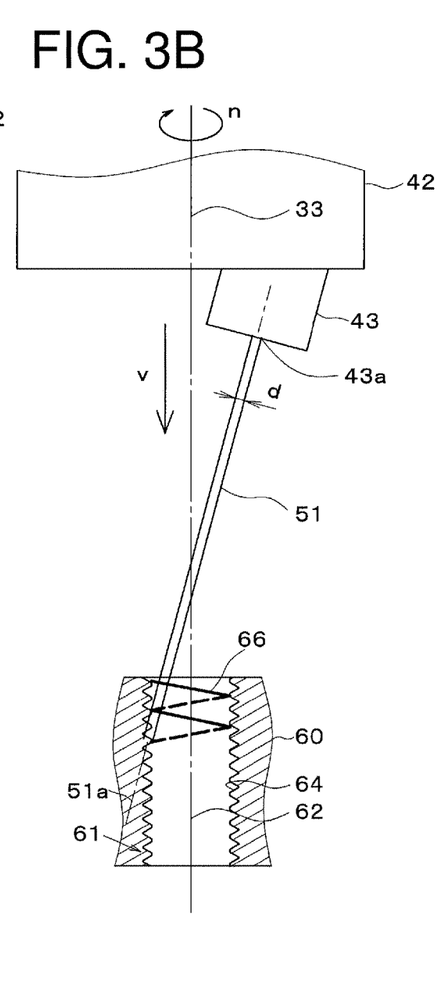

FIG. 3B shows the state of cleaning in step S4. The nozzle hole 43a approaches the mouth 63 along the central axis 62 at a constant feeding velocity v. The jet 51 impinges on the thread 64. The points at which the jet 51 impinges on the thread 64 form a helical trajectory 66. The trajectory 66 has a width that allows the jet 51 to impinge on the thread 64. The width that allows the jet 51 to impinge on the thread 64 is determined by the included angle θ and the diameter d of the nozzle hole 43a. When the jet 51 impinges on the thread 64, a portion of the jet 51 bends along the surface of the thread 64. The remaining portion of the jet 51 bounces off the thread 64. The jet 51 has the dynamic pressure that can remove chips, burrs, scrap pieces of fiber, or other foreign matter remaining on the thread. In this manner, the jet 51 uniformly cleans the thread 64. With the jet centerline 51a intersecting with the central axis 62, the jet 51 perpendicularly impinges on the thread 64 as viewed along the central axis (axis line) 62 of the female screw 61. This allows substantially the same effective cleaning of the female screw 61 with any thread diameter.

The feeding velocity v is obtained using the expression below:

$$v = Cnd/\sin\theta$$

where C is a constant representing the degree of overlapping, d is the diameter (mm) of the nozzle hole, v is the feeding velocity (mm/s), n is the rotational speed (1/s), and θ is the included angle (degrees) between the jet and the axis.

The constant C is the degree of overlapping of the trajectory 66. The constant C falling between 0 and 1 inclusive represents the trajectory having overlapping portions, whereas the constant C less than 1 represents the trajectory with spaced portions. The constant C may be between 0 and 20 inclusive, depending on the level of cleaning to be achieved. The constant C may be greater than 1, when the jet 51 flows along and bounces off the thread 64 upon impinging on the thread 64. When no movement is along the central axis 62 (C=0), step S3 may be skipped, and the nozzle 43 may be moved to direct the jet 51 onto a position around the middle of the thread 64. In this case, when the jet 51 impinges on the thread 64, the nozzle 43 is stopped at this position for a predetermined time.

Figure 3C:
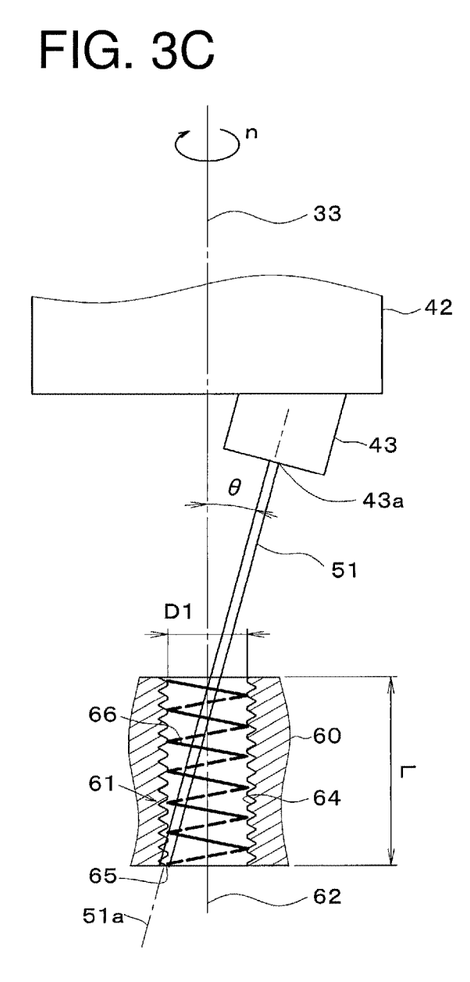

FIG. 3C shows the state of cleaning when the jet 51 impinges on an end 65. After the jet 51 impinges on the end 65, the nozzle 43 continues to rotate while moving toward the mouth 63 of a next female screw. The jet 51 directly reaches the end 65 without impinging on the thread 64. Thus, the included angle θ satisfies the expression below:

$$0 < \theta \leq \tan^{-1}\left(\frac{D1}{L}\right)$$

where D1 is the minor diameter of the female screw (hole diameter) (mm), and L is the length of the female screw (mm).

The advantages of the cleaning method according to the present embodiment will now be described. The nozzle 43 is not inserted in the female screw 61. This prevents the wobbling rotating nozzle 43 from interfering with the workpiece 60.

When the female screw 61 formed in a through-hole is cleaned with a technique known in the art, a jet ejected along the central axis 62 passes through the through-hole along the inner surface of the hole, without directly impinging on the thread 64. The thread 64 is cleaned with splashes around the jet. This cleaning can leave chips or other foreign matter on the thread of the female screw 61 formed in the through-hole.

The cleaning method according to the present embodiment directs the jet 51 to impinge on the thread 64 while the jet 51 is rotating about the central axis 62 of the female screw 61. The jet 51 thus uniformly and directly impinges on the thread 64. After impinging on the thread 64, the jet 51 repeatedly splashes over the thread 64 while bouncing off and bending along the thread 64, and cleans all the surfaces of the thread 64 including thread roots. The cleaning method according to the present embodiment is thus particularly suitable for cleaning a female screw formed in a through-hole.

With the cleaning method according to the present embodiment used for a female screw formed in a blind hole, the jet 51 spirally enters the female screw 61, and then is discharged easily after impinging on the thread 64. When the jet 51 that has impinged on the thread 64 is discharged, the jet 51 removes chips or other foreign matter on the thread 64. The cleaning method according to the present embodiment is thus also effective for the female screw 61 formed in a blind hole. The jet 51 directly impinges on the thread of the female screw formed in the blind hole as well, and cleans its surfaces including thread roots.

The cleaning method according to the present embodiment can be used in high-pressure cleaning. In particular, the cleaning method according to the present embodiment used in high-pressure cleaning with the cleaning liquid ejection pressure ranging from 10 to 50 MPa allows powerful cleaning of the female screw 61. The high dynamic pressure of the straight stream of the jet 51 can effectively remove foreign matter stuck to the thread or chips firmly caught by the thread.

The cleaning method according to the present embodiment can be used for female screws 61 with different major diameters D by varying the distance LN between the nozzle hole 43a and the mouth 63 of each female screw 61. In addition, the same feeding velocity v can also be used for female screws 61 with different major diameters D. The cleaning method can be easily used for all female screws 61 with different major diameters D that may be included in the workpiece 60.

The cleaning device 10 according to the present embodiment includes the moving unit 11 that uses orthogonal axes, and allows the nozzle block 42 to move with a substantially straight trajectory. The nozzle 43 attached to the nozzle block 42 is spaced from the rotation axis 33 and is inwardly tilted to the rotation axis 33. The cleaning method according to the present embodiment can be implemented simply with the procedure described below. The nozzle block 42 is first rotated. The rotation axis 33 is then aligned with the central axis 62 of the female screw 61, and the distance between the nozzle hole 43a and the mouth 63 is adjusted. The nozzle block 42 is moved at a velocity v along the central axis 62. A program for moving the nozzle block 42 can be easily created. Further, simply rotating the nozzle block 42 with the rotation axis 33 being aligned with the central axis 62 produces the jet 51 that rotates about the central axis 62 at a predetermined optimum distance maintained from the female screw 61. The cleaning device 10 according to the present embodiment is thus suitable for implementing the cleaning method according to the present embodiment.

Female screws 61 arranged dispersedly in a wide area of the workpiece 60 may be cleaned one after another while the nozzle block 42 is being rotated to widely and powerfully clean the areas between the female screws 61. For example, the method can be used for cleaning the housing mounting surface of a transaxle case for an automobile. Female screws formed in the housing mounting surface can be cleaned one after another with the cleaning method according to the present embodiment to clean the entire mounting surface. This increases the adhesiveness of the mounting surface.

Second Embodiment

Figure 4:
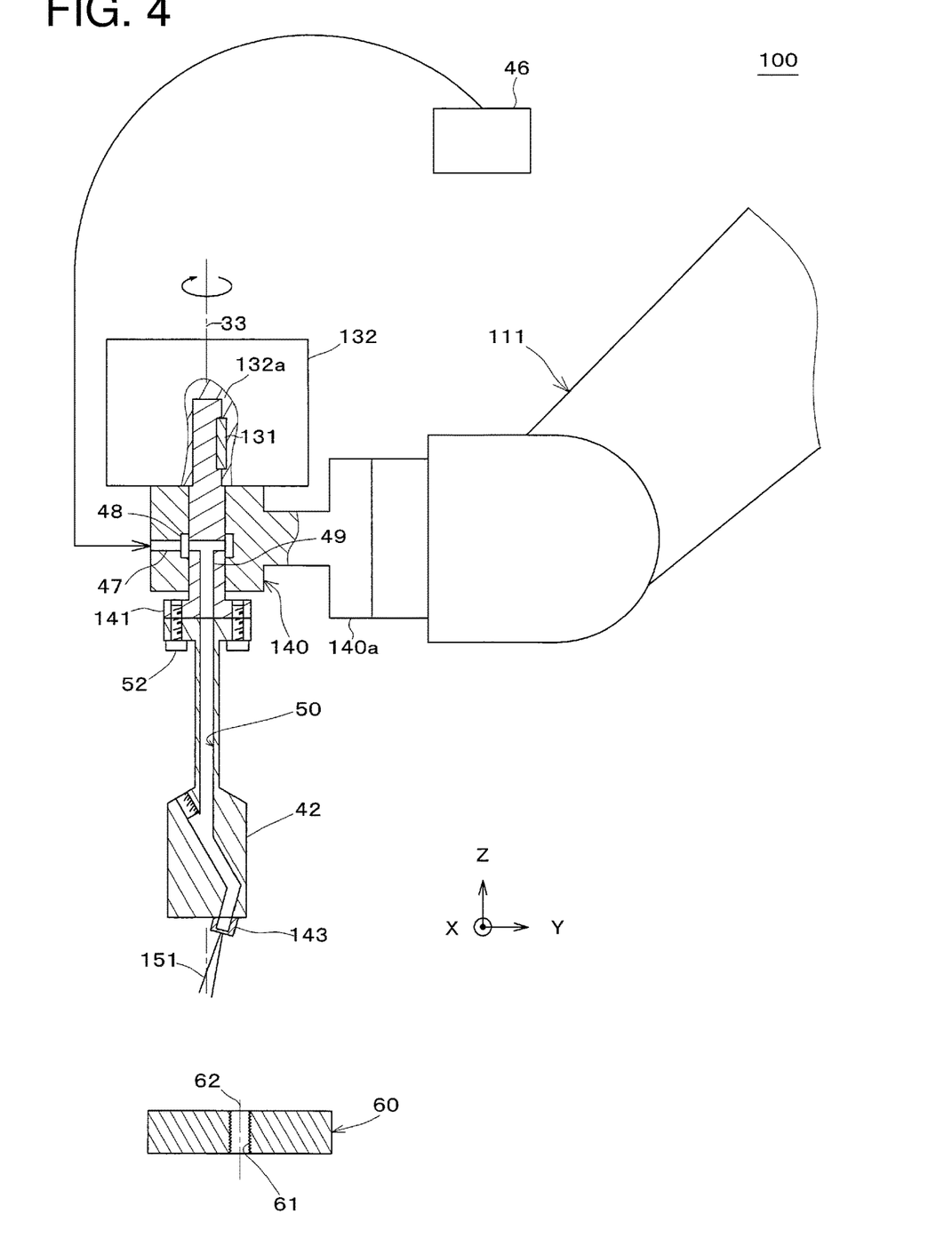
FIG. 4 is a partial longitudinal cross-sectional view of a cleaning device according to a second embodiment.

Referring now to FIG. 4, a cleaning device 100 according to a second embodiment will be described, focusing on its differences from the cleaning device 10 according to the first embodiment.

The moving unit in the present embodiment is a vertical multi-articulated robot 111. A housing 140 is fixed at the distal end of the arm of the robot 111. A spindle 141 is rotated by an air motor 132. A nozzle 143 is a flat spray nozzle. The other components are the same as those of the cleaning device 10 according to the first embodiment, and are given the same reference numerals and will not be described in detail.

The robot 111 is a vertical six-axis multi-articulated robot. The robot 111 may be dustproof and waterproof. The robot 111 without dustproof and waterproof functions is covered by, for example, a protective bellow.

The housing 140 according to the present embodiment is the same as the housing 40 in the first embodiment except an additional flange 140a formed on the housing 140. The housing 140 is fixed to the arm of the robot 111 with the flange 140a. The flow channel 47 is connected to the cleaning liquid source 46 with a rubber or plastic hose. The rubber or plastic hose may be contained in a metal or resin protective tube.

The spindle 141 extends through the housing 140. The spindle 141 has an upper portion protruding from the housing 140 and having a key 131.

The air motor 132 including a hollow shaft 132a drives the spindle 141. The hollow shaft 132a is coupled to the spindle 141 via the key 131. The driving source, which is the air motor 132, is substantially trouble-free if the cleaning device is under high humidity and high temperature. The air motor 132 is replaceable with a waterproof servomotor, a synchronous motor, or other motors.

The nozzle 143 produces a flat spray that diverges in the shape of a fan. The nozzle 143 is attached to produce a jet that diverges vertically. More specifically, the jet diverges in the Z direction.

Figure 5:
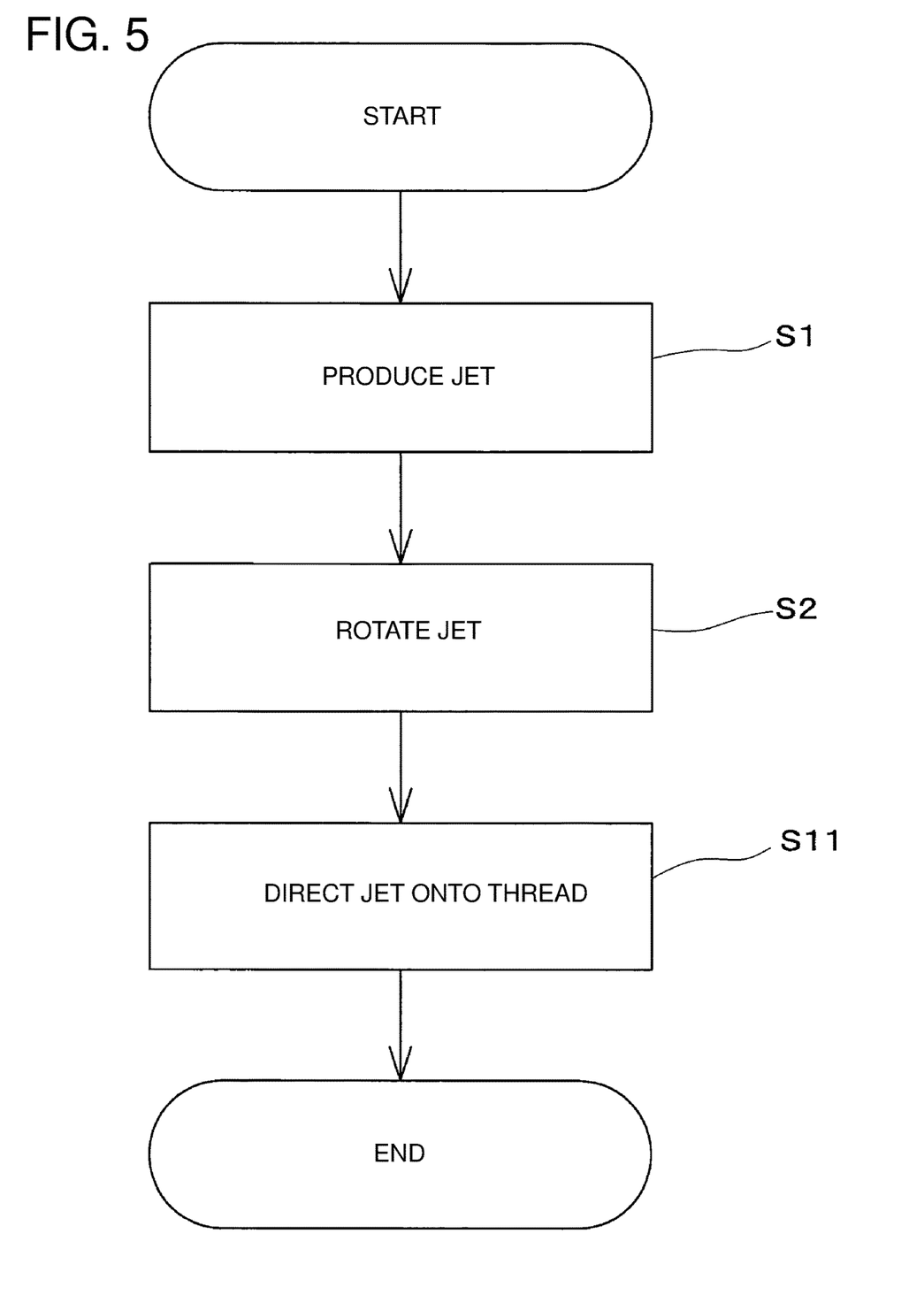
FIG. 5 is a flowchart showing a cleaning method according to the second embodiment.
Figure 6:
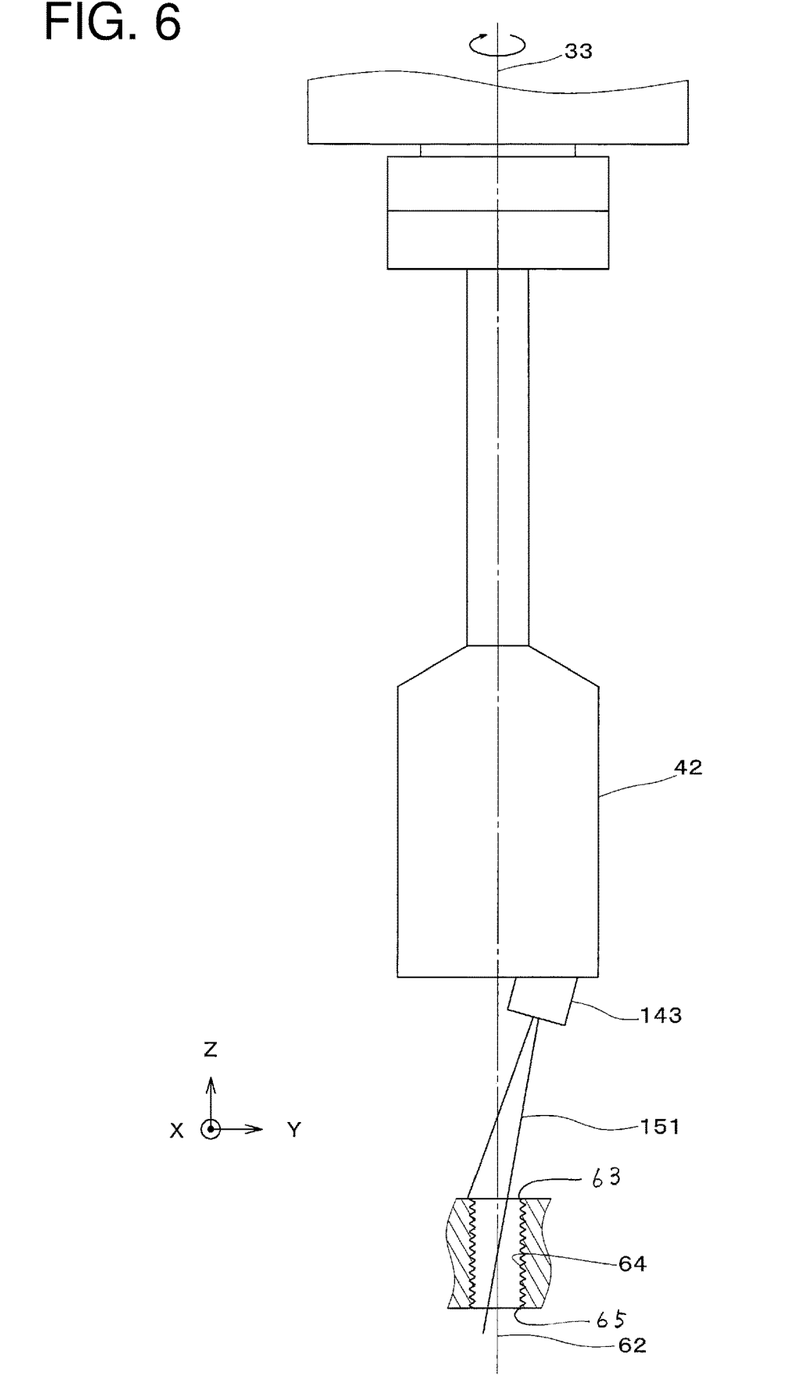
FIG. 6 is a diagram describing the cleaning method according to the second embodiment.

Referring now to FIGS. 4 to 6, a method for cleaning a female screw with the cleaning device 100 will be described. The cleaning liquid source 46 is first driven to produce a jet 151 (S1). The air motor 132 is then rotated (S2). This causes the spindle 141 and the nozzle 143 to rotate in cooperation with each other. The robot 111 then aligns the rotation axis 33 with the central axis 62, and moves the nozzle 143 to produce the jet 151 that diverges to cover the entire surface of the thread 64. The rotating jet 151 impinges on the thread 64 to clean the thread 64 across the entire length at a time (S11).

The jet 151 impinges in the area ranging from the mouth 63 to the end 65 of the thread 64.

The robot 111 is not limited to a vertical multi-articulated robot, and may be a parallel link robot, a horizontal multi-articulated robot, and a linear robot. The robot 111 is replaceable with the moving unit 11 in the first embodiment.

The cleaning method according to the present embodiment eliminates the process of forwarding the nozzle block 42 along the central axis 62, and cleans the female screw 61 effectively within a short time. The cleaning method has the same other advantageous effects as in the first embodiment, which will not be described.

Third Embodiment

Figure 7:
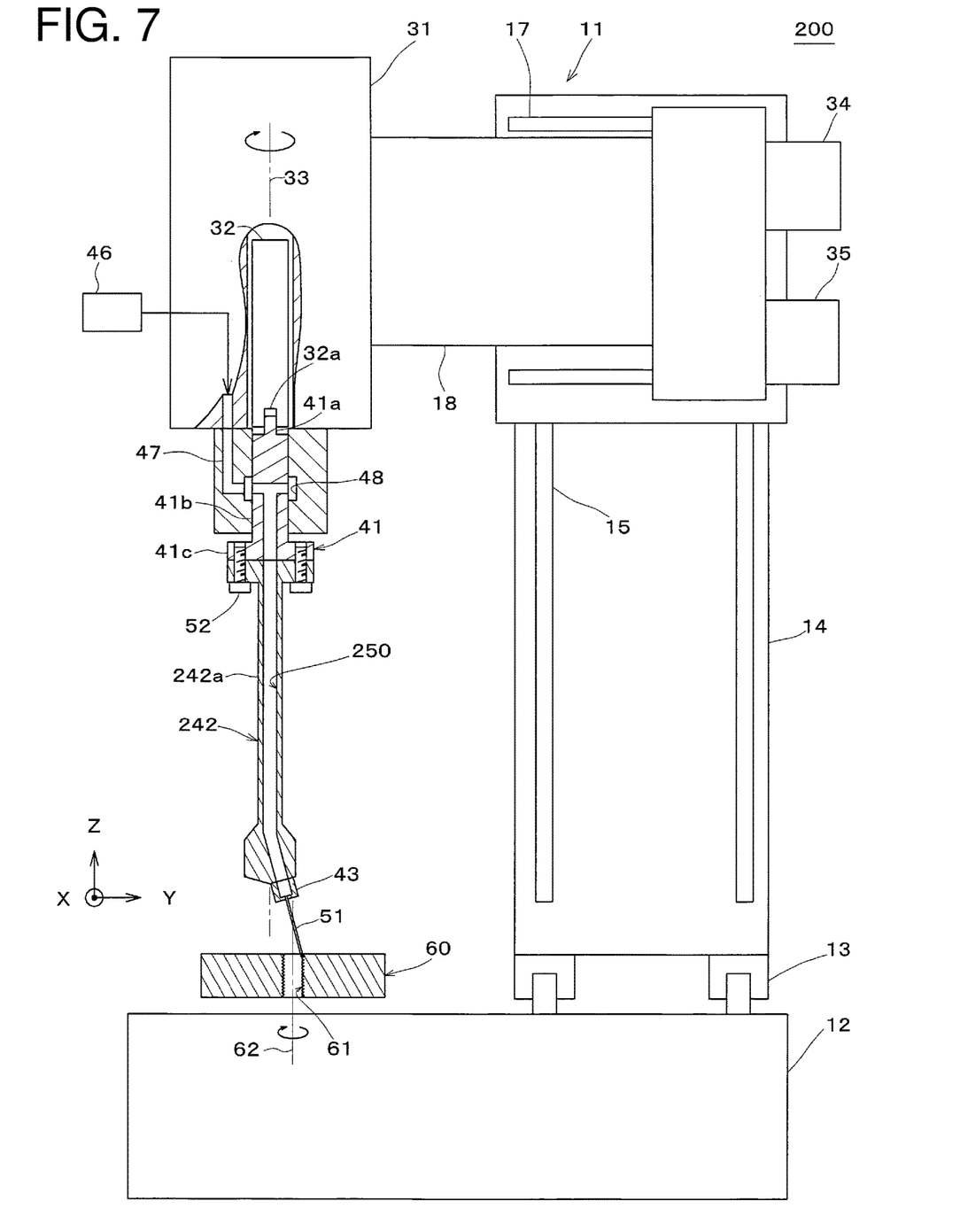
FIG. 7 is a partial longitudinal cross-sectional view of a cleaning device according to a third embodiment.
Figure 8:
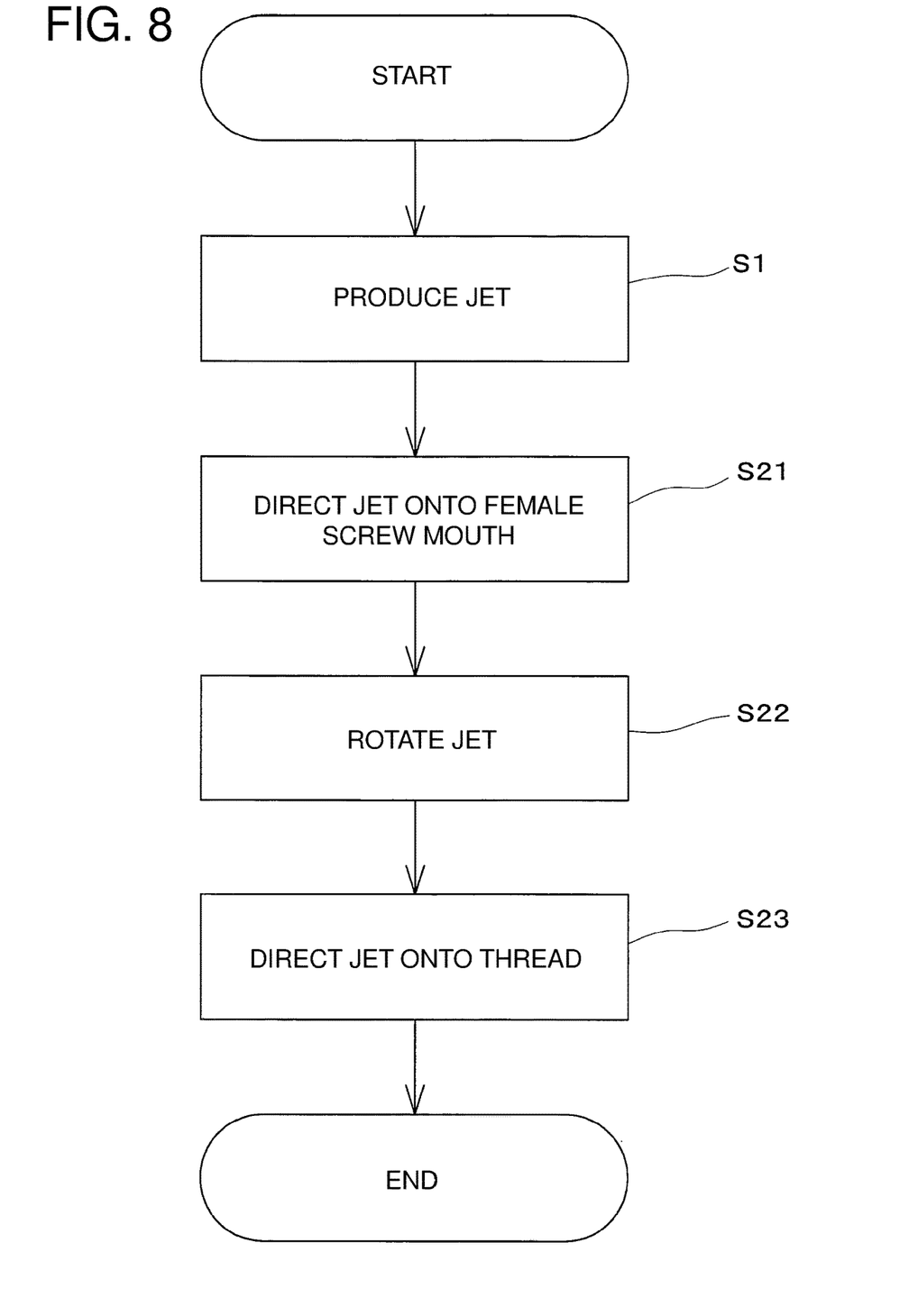
FIG. 8 is a flowchart showing a cleaning method according to the third embodiment.
Figure 9:
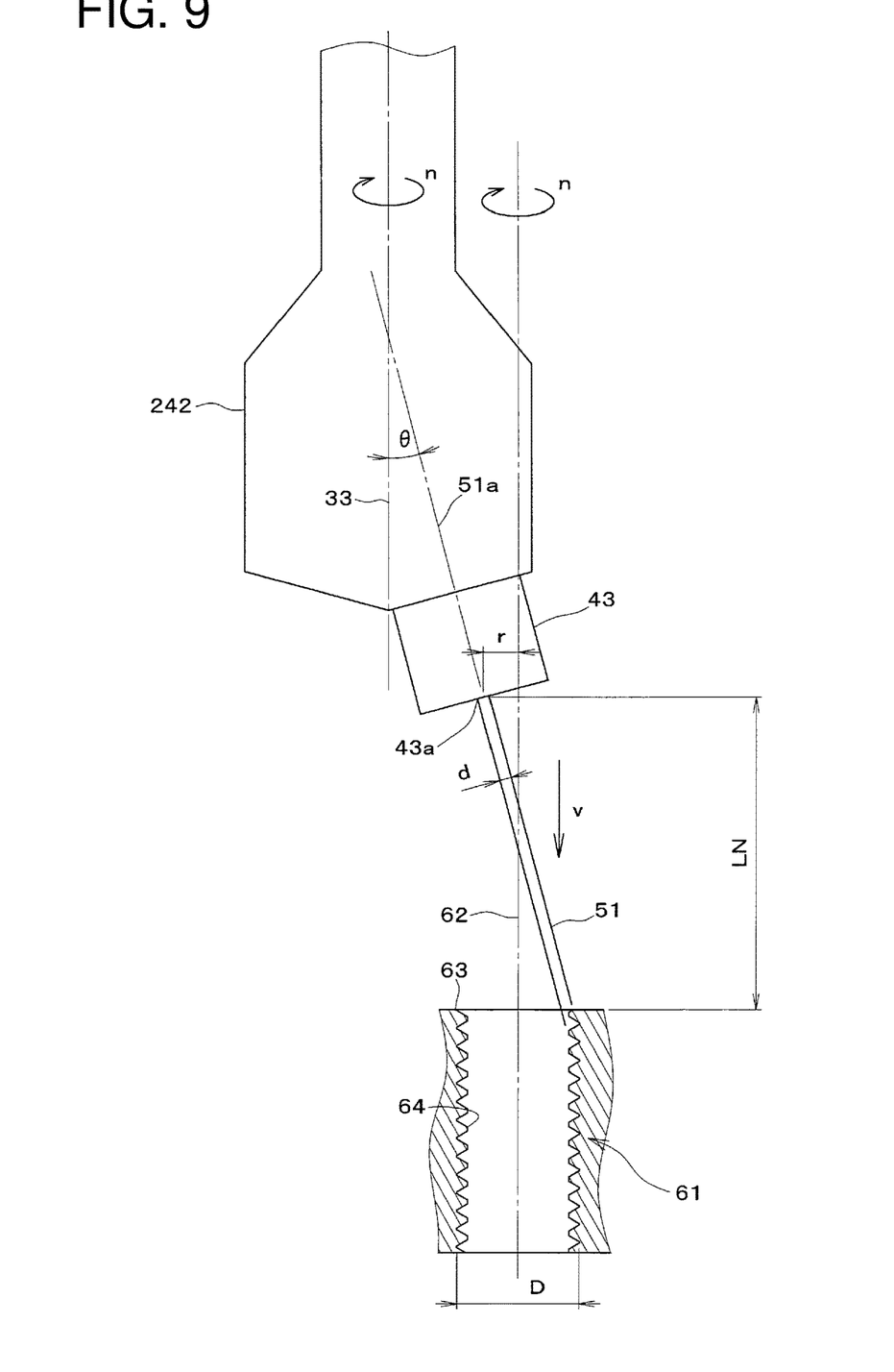
FIG. 9 is a diagram describing the cleaning method according to the third embodiment.

Referring now to FIGS. 7 to 9, a cleaning method according to a third embodiment will be described. A cleaning device 200 according to the present embodiment includes a nozzle block 242 with a shape different from that of the nozzle block in the cleaning device 10 according to the first embodiment. The nozzle block 242 also forms a movement trajectory different from that in the first embodiment. The features of the present embodiment will be described below. The same components as those in the first embodiment are given the same reference numerals and will not be described in detail.

As shown in FIG. 7, an L-shaped oblique nozzle is used in the present embodiment. The nozzle block 242 includes a shaft 242a extending along the rotation axis 33. The shaft 242a has an internal channel 250 extending to its distal end. The distal end of the shaft 242a has the nozzle 43 tilted from the rotation axis 33. The nozzle block 242 is fixed to the spindle 41 with bolts 52.

The cleaning method will now be described with reference to FIGS. 8 and 9. The jet 51 is first produced (S1). The jet 51 is then directed onto the mouth 63 of the female screw 61 (S21). The jet 51 is rotated about the central axis 62 (S22). The rotating jet 51 moves along the central axis 62, and impinges on the thread 64 (S23).

Step S21 will now be described. The turret is moved to direct the jet 51 onto the mouth 63 across the central axis 62 of the female screw 61. The distance LN between the nozzle hole 43a and the mouth 63 is obtained using the expression below:

$$LN = \frac{r + D/2}{\tan\theta}$$

where r is the distance between the nozzle hole 43a and the central axis 62, D is the major diameter of the female screw 61, and $\theta$ is the included angle between the jet centerline 51a and the rotation axis 33.

Step S22 will now be described. The nozzle block 242 rotates at a rotational speed n while maintaining a fixed distance between the rotation axis 33 and the central axis 62 to circle with a radius r. The spindle 41 rotates in cooperation with the nozzle block 242 at the rotational speed n. The rotation of the nozzle block 242 (circling) is synchronized with the rotation of the spindle 41 (rotating on its own axis). This produces the jet 51 that rotates about the central axis 62. When the synchronization is perfect, the rotating jet 51 intersects with the central axis 62.

When the synchronization is imperfect, the jet 51 does not intersect with the central axis 62. The female screw 61 can still be cleaned with the jet 51 impinging on the mouth 63 or the thread 64.

In the present embodiment, the female screw 61 can be effectively cleaned using the L-shaped oblique nozzle without using a special nozzle block for cleaning the female screw 61. The present embodiment has the same other advantageous effects as described in the first embodiment.

The embodiments disclosed herein should not be construed to be restrictive, but may be modified variously without departing from the scope and spirit of the invention, and to cover all technical matters falling within the technical ideas defined by the appended claims. Although preferred exemplary embodiments have been shown and described, it will be apparent to those skilled in the art that various changes, modifications, alterations, or improvements may be made to the invention in view of the disclosure herein, and all such variations are considered within the scope of the invention.

REFERENCE SIGNS LIST 10, 100, 200 cleaning device
11 moving unit
111 robot (moving unit)
32 drive shaft
132 air motor
33 rotation axis
40, 140 housing
41, 141 spindle
42, 242 nozzle block
43 nozzle
46 cleaning liquid source
51 jet
61 female screw
62 central axis (axis line)
63 mouth
64 thread
$\theta$ included angle

What is claimed is:

1. A cleaning method for a female screw, the method comprising:
   producing a jet of a cleaning liquid from a nozzle in a direction tilted from a center axis of the female screw without inserting the nozzle in the female screw;
   directing the jet to impinge on a thread of the female screw while rotating the jet about the center axis;
   directing the jet to impinge on the thread with both the nozzle and the thread exposed to the atmosphere;
   directing the jet to impinge on a mouth of the female screw; and moving the jet along the center axis and directing the jet spirally to impinge on the thread,
wherein the female screw has the thread formed in a through-hole,
the jet intersects with the center axis of the female screw and impinges on the thread and,
the jet is a straight stream.

2. The cleaning method according to claim 1, wherein
the included angle θ between the centerline of the jet and the center axis satisfies the expression below:

$$0 < \theta \leq \tan^{-1}\left(\frac{D1}{L}\right)$$

where D1 is a minor diameter of the female screw, and L is a length of the female screw.

3. The cleaning method according to claim 1, further comprising
producing, from a nozzle hole of the nozzle, a flat spray that diverges in a shape of a fan in a plane extending along the center axis of the female screw,
wherein the step of directing the jet includes directing the jet to impinge in an area from the mouth to an end of the thread.

4. The cleaning method according to claim 1, wherein
the jet has an ejection pressure of 10 to 50 MPa.

* * * * *